Aug. 9, 1938.  C. L. EKSERGIAN  2,126,372
VEHICLE WHEEL
Filed May 7, 1934
FIG. 1
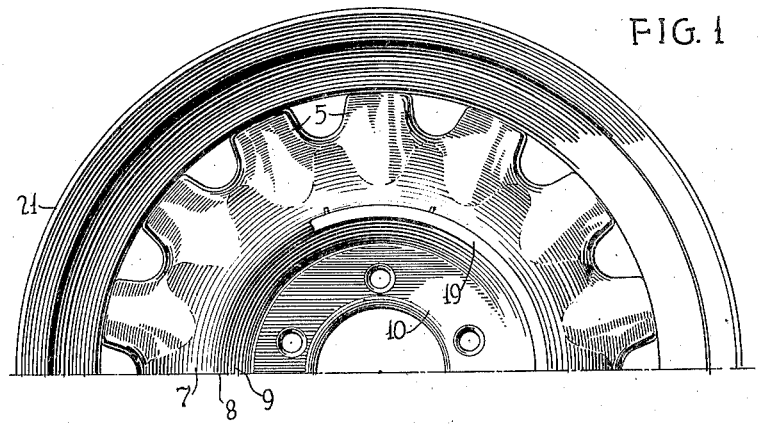
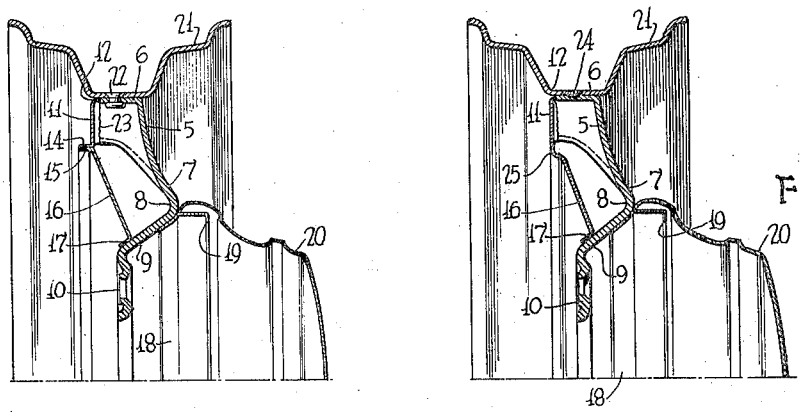
FIG. 2   FIG. 3
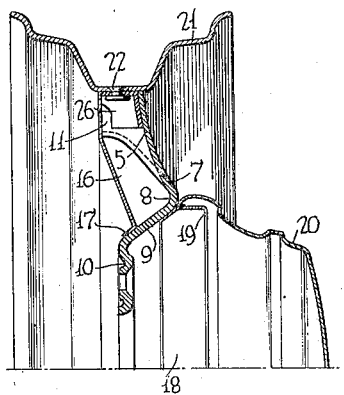
FIG. 4
INVENTOR.
CAROLUS L. EKSERGIAN.
BY John P. Tarbox
ATTORNEY.

Patented Aug. 9, 1938

2,126,372

UNITED STATES PATENT OFFICE 2,126,372

VEHICLE WHEEL

Carolus L. Eksergian, Detroit, Mich., assignor to Budd Wheel Company, Philadelphia, Pa., a corporation of Pennsylvania Application May 7, 1934, Serial No. 724,234

5 Claims. (Cl. 301—64)

This invention relates to a vehicle wheel, and particularly a die stamped sheet metal wheel of the artillery type.

One object of the invention is to make a hollow section front spider or body as the main load carrier, and to have it merge into a bolting-on flange rearwardly of the front thereof and to cooperate with a rear annulus, or spider including an annulus of particular character for closing the rear open side of the body and inner ends of the spokes.

Further objects include reduction in weight consistent with necessary strength, simplification of dies and die-drawing operations, advantageously working the metal, facilitating fabrication, assembly, welding and installation, preventing corrosion, enhancing the appearance, and rendering the structure simple and durable in construction, economical to manufacture and effective in its operation.

In particular, among the many variegated shapes of hollow sheet metal wheels that have been proposed to take care of widely different and difficult conditions of manufacture, assembly, welding, cost and service, the wheel of the present invention comprises, in its preferred form, a front spider of heavy gauge sheet metal, tapering outwardly from a radially inner portion to its radially-outer limits, and constituted as a one-piece stamping having spoke portions of rear opening deep channel section closed at the outer ends, and embodying a conical nave merging about a section of gradual curvature into a rearwardly converging conical annulus having a rear end bolting-on flange at about the wheel load plane.

A rear spider of lighter-gauge sheet metal may comprise one or a greater number of stampings or parts including spoke portions of front opening shallow channel section having closed outer ends and flash welded in abutting edge relation to the edges of the front spider spoke portions. The rear spider also includes a conical annulus, radially inwardly of its spoke portions, converging forwardly therefrom and having a radially inner margin nesting with and/or secured, as by welding, in side surface relation to the rearwardly extending annulus of the front spider adjacent to the juncture of such annulus with the bolting-on flange.

The structure in which said rear spider annulus may also take the form of a separate stamping of channel section nesting an annulus of less radial extent on the spokes or other portion of a wheel of other types, thus, not only simplifies the fabrication, assembling and welding of the wheel for certain applications, but also provides a novel hollow wheel closure which may also share the load.

The invention will be better understood by reference to the following description and the accompanying drawing, in which:

Figure 1 is a view, in front elevation, of a portion of a wheel of my invention, parts being broken away and omitted for clearness, Figure 2 is a view, in axial section through the center of a spoke, of the structure of Figure 1, and Figures 3 and 4 are views, similar to Figure 2, of modified forms of the invention; corresponding parts in all of the figures designated by corresponding reference characters.

Referring to Figures 1 and 2, a sheet metal front spider stamping, of radially outwardly decreasing heavy gauge thickness, comprises spoke portions 5 of rear opening deep channel section having outer end closure elements 6, and a conical nave 7 merging, into a gradually curved section 8, into a rearwardly converging conical annulus 9 having a rear end radially inner bolting-on flange 10 of usual character. The hollow portion of the front spider body, inwardly of the spokes, is therefore of annular rear opening channel section having a long radially outer axial side and a shorter radially inner axial side 9, on which the flange 10 is disposed.

A rear spider, preferably of lighter-gauge sheet metal and constituted chiefly as a means for closing the hollow front spider, although it may share some of the load, comprises spoke portions 11 of front opening shallow channel section having outer end closure elements 12 and an annulus, radially inwardly of its spoke portions, of angle axial section forming a rearwardly extending flange 14.

An annulus having a flange 15 nesting within the flange 14 and a forwardly converging cone 16, also, has a radially inner flange or margin 17 nesting within the cone 9 in side surface engagement therewith, and thus constitutes a portion of the rear spider, or an annulus of rear opening channel section closing the body inwardly of the spokes. Preferably, the rear spider annuli are constructed from concentric sheets of one original stamping. The flanges 14 and 15 may be edge welded, spot welded or otherwise secured to each other, and the flange 17 spot welded or otherwise secured to the cone 9; the relations of parts thus facilitating assembly by permitting a choice of methods, and being arranged to effectively distribute the load forces, as well as forming an effective seal, and constituting simple die-drawing shapes.

An annulus of radially inwardly opening channel section may have a side or flange 18 shaped and welded to the inner side of the cone 9 and an angle section 19 constituting a support for a hub cap 20; the annulus, in general, reinforcing the front spider. An annulus having similar shape but extended forwardly may be substituted, and a hub cap of less axial extent substituted for the hub cap 20.

A rim 21, shown as of conventional drop-center type, although a rim of other type may be employed, is secured, as by rivets 22 to the composite end closure of the spoke portions 5 and 11 which are preferably flash welded, as represented by a weld seam 23, in abutting edge relation.

In the modification of Fig. 3, the structure is similar to that of Figs. 1 and 2 with the exception that the flanges 14 and 15 are omitted, the spoke portions 11 and the parts 16 and 17 are parts of one stamping, and the composite spokes are secured to the rim 21 by weld plugs 24, instead of the rivets 23. In this form, the rear spider may advantageously have a reverse curve section 25 between the spoke portions 11 and the cone 16.

As shown in Fig. 4, the front spider spokes 5 are not closed at the outer ends by initially integral parts, as the parts 6, but have gussets 26 welded thereto for this purpose and to receive the rivets 22. The rear spider spoke portions 11 are also not of channel section, but of plane sheet form, as are the parts 16 and 17 thereof, in the one integral stamping.

While by way of illustration and example I have described my invention in connection with certain preferred embodiments thereof as to structure, and the preferred manner of practicing it, it will be obvious to those skilled in the art, after understanding the foregoing, that various changes and modifications may be made without departing from the spirit or scope of the appended claims to cover all such modifications and changes.

What I claim is:

1. An artillery steel wheel comprising a one-piece main load front spider stamping of radially outwardly tapering heavy gauge sheet metal including spoke portions of rear opening deep channel section having closed outer ends and embodying a conical nave merging through a gradually curved section into a rearwardly converging conical annulus having a radially inner rear end bolting-on flange, and a rear spider of lighter-gauge sheet metal including spoke portions of front opening shallow channel section having closed outer ends and flash welded in abutting outer end and channel side edge relation to the corresponding edges of the front spider to form tubular composite spokes closed at the ends and sides, said rear spider also including a conical annulus radially inwardly of its spoke portions converging forwardly therefrom and having a rearwardly turned radially inner margin nesting within, and welded to, said rearwardly converging conical annulus of the front spider adjacent to the juncture thereof with the bolting-on flange.

2. An artillery steel wheel comprising a main load heavy gauge sheet metal front spider including spoke portions of rear opening deep channel section and embodying a conical nave merging into a rearwardly converging conical annulus having a radially inner rear end bolting-on flange, and a rear spider of lighter-gauge sheet metal including spoke portions of front opening shallow channel section flash welded in abutting channel side edge relation to the channel side edges of the front spider to form tubular composite spokes and embodying a conical annulus radially inwardly of its spoke portions converging forwardly therefrom and having a radially inner margin welded in side surface relation to the front spider adjacent to the juncture of the bolting-on flange with said rearwardly converging conical annulus.

3. An artillery steel wheel comprising a main load sheet metal front spider including spoke portions of rear opening channel section and embodying a nave merging into a rearwardly extending annulus having a rear end bolting-on flange, and a sheet metal rear spider including spoke portions of front opening channel section flash welded in abutting channel side edge relation to the channel side edges of the front spider to form tubular composite spokes and embodying an annulus radially inwardly of its spoke portions converging forwardly therefrom and having a radially inner margin welded in side surface relation to the front spider adjacent to the juncture of the bolting on flange with said rearwardly extending annulus.

4. An artillery steel wheel comprising a main load front spider including spoke portions and a nave merging into a rearwardly extending annulus having a bolting-on flange, a rear spider stamping including spoke portions cooperating with the spoke portions of the front spider to form tubular composite spokes and an annulus radially inwardly of its spoke portions having a rearwardly extending axial flange, and an annular stamping including a radially outer axial margin nesting within said rearwardly extending axial flange and a conical section converging forwardly from said margin to a radially inner margin in side surface engagement with the front spider and secured thereto.

5. An artillery steel wheel comprising a main load front spider including spoke portions and a nave merging into a rearwardly extending annulus having a bolting-on flange, a rear spider including spoke portions cooperating with the spoke portions of the front spider to form tubular composite spokes and an annulus radially inwardly of its spoke portions having an axial flange, and a sheet metal rear annulus including a radially outer axial margin nesting within said axial flange and a section extending to a radially inner margin in side surface arrangement with the front spider and secured thereto.

CAROLUS L. EKSERGIAN.